US006632764B2

(12) United States Patent
Drückhammer et al.

(10) Patent No.: US 6,632,764 B2
(45) Date of Patent: Oct. 14, 2003

(54) METHOD FOR CONTROLLING THE REGENERATION OF AN $NO_X$ STORAGE CONVERTER

(75) Inventors: Jens Drückhammer, Braunschweig (DE); Frank Schulze, Vortorf (DE); Axel Lang, Wolfenbüttel (DE)

(73) Assignee: Volkswagen AG (DE)

( * ) Notice: Subject to any disclaimer, the term of this patent is extended or adjusted under 35 U.S.C. 154(b) by 67 days.

(21) Appl. No.: 09/759,361

(22) Filed: Jan. 16, 2001

(65) Prior Publication Data

US 2002/0128146 A1 Sep. 12, 2002

(30) Foreign Application Priority Data

Jan. 19, 2000 (DE) ........................................ 100 01 994
Feb. 24, 2000 (DE) ........................................ 100 08 564

(51) Int. Cl.[7] ................................................ B01J 20/34
(52) U.S. Cl. ........................................................ 502/20
(58) Field of Search ............................. 502/20, 34, 52; 436/37; 423/235, 239.1, 400, 402, 405, 213.2

(56) References Cited

U.S. PATENT DOCUMENTS

| | | | | | |
|---|---|---|---|---|---|
| 4,973,399 | A | * | 11/1990 | Green et al. | 208/120.1 |
| 5,740,669 | A | * | 4/1998 | Kinugasa et al. | 60/285 |
| 5,887,422 | A | * | 3/1999 | Abe et al. | 60/274 |
| 6,171,565 | B1 | * | 1/2001 | Hohne et al. | 423/239.1 |
| 6,327,851 | B1 | * | 12/2001 | Bouchez et al. | 60/286 |
| 2001/0002550 | A1 | * | 6/2001 | Zhang et al. | 73/118.1 |

FOREIGN PATENT DOCUMENTS

| | | | |
|---|---|---|---|
| DE | 195 43 219 | C1 | 12/1996 |
| DE | 196 45 202 | A1 | 6/1997 |
| DE | 196 07 151 | C1 | 7/1997 |
| DE | 198 30 829 | C1 | 4/1999 |
| DE | 198 08 382 | A1 | 9/1999 |
| DE | 198 28 929 | A1 | 1/2000 |
| EP | 0 936 349 | A2 | 8/1999 |

* cited by examiner

*Primary Examiner*—Stanley S. Silverman
*Assistant Examiner*—Edward M. Johnson
(74) *Attorney, Agent, or Firm*—Rabin & Berdo, PC

(57) ABSTRACT

An $NO_x$ concentration in exhaust gas is measured downstream of an $NO_x$ storage converter. For determining an operating state, particularly damage to the $NO_x$ storage converter, when the $NO_x$ storage converter switches from an absorption mode to a regeneration mode, the values of characteristic features of an $NO_x$ desorption peak in the time curve of the NOx concentration are ascertained and compared to predetermined test patterns, with a comparison result being formed, from which a converter-state signal that characterizes the operating state of the $NO_x$ converter is determined.

17 Claims, 3 Drawing Sheets

METHOD FOR CONTROLLING THE REGENERATION OF AN $NO_x$ STORAGE CONVERTER

BACKGROUND OF THE INVENTION

The invention relates to a method and an apparatus for controlling the regeneration of an $NO_x$ storage converter that is disposed in the exhaust-gas system of an internal-combustion engine and can be operated in an absorption mode and a regeneration mode, with the operating parameters of the internal-combustion engine being changed as a function of the operating state of the $NO_x$ storage converter.

$NO_x$ storage converters are primarily used in lean-mix engines. In this type of engine, the so-called lean-mix operation, with a so-called lambda value>1 of the air-fuel mixture, is preferred over a stoichiometric operation, with a lambda value=1, or a so-called rich-mix operation, with a lambda value<1, because a significantly lower fuel consumption can be attained with a surplus of air in the air-fuel mixture, i.e., with a lambda value>1. Stratified-charge engines represent a special kind of lean-mix motor. In the stratified-charge operation of a stratified-charge engine, a lean air-fuel mixture is supplied to the engine, and an ignitable, rich air-fuel mixture is made available in the combustion chamber in the vicinity of the spark plug, while a lean mixture is present in the remainder of the combustion chamber. The spark plug first ignites the rich air-fuel mixture, which then ignites the lean mixture. The 3-way converter conventionally used up to this point, however, cannot single-handedly reduce the exhaust gases that are formed in the operation of a lean-mix engine to harmless gas components, because it requires the supply of air and fuel in a precisely-defined stoichiometric ratio. An $NO_x$ converter, in contrast, can absorptively store nitrogen oxides for a limited time under certain marginal conditions, with a lambda value>1, and re-release them at a later time, with a lambda value<1 or =1, and reduce them to harmless gases. In a stratified-charge engine, the $NO_x$ converter is operated in a so-called absorption mode during stratified-charge operation. In the homogeneous operation of the engine, in contrast, a stoichiometric or rich air-fuel mixture is supplied, and the $NO_x$ storage converter is operated in a so-called regeneration mode. Usually, $NO_x$ storage converters operate in storage cycles, which encompass at least one relatively slow absorption mode and a faster regeneration mode.

The function and efficiency of an $NO_x$ storage converter depend on numerous influential factors, and can particularly be subjected to reversible and irreversible damage. Reversible damage can be caused by, for example, a thionation of the converter, which notably leads to a reduction in the $NO_x$ storage capacity or the creation of mechanical stresses in the converter. Thermal damage, such as the sintering of a converter component, the separation of converter and storage components, or an increasingly inhomogeneous, near-surface $NO_x$ charge, cause irreversible damage to the $NO_x$ converter. Thermal damage typically results in not only a reduction in the $NO_x$ storage capacity, but also a reduced oxygen storage capacity of the converter. Production-related variations in properties, along with these operation-related types of damage, can also influence the efficiency and function of the converters. Under certain marginal conditions, reversible damage to an $NO_x$ converter can be at least partially remedied through regeneration measures during driving operation. For example, desulfurization can be achieved through a temporary increase in the exhaust-gas temperature. With the occurrence of irreversible damage, however, the only possible regeneration measure is to adapt the operating parameters of the engine and/or the exhaust-gas system, thereby taking into account the altered efficiency of the exhaust-gas purification.

DE 196 07 151 C1 discloses a method for regenerating an $NO_x$ storage converter, in which a regeneration phase is initiated as a function of an operating state of the $NO_x$ storage converter. The operating state corresponds to at least one limit quantity of $NO_x$ compounds that are emitted by the $NO_x$ storage converter. The emitted quantity of $NO_x$ compounds is ascertained from the signal of a lambda sensor disposed upstream of the $NO_x$ storage converter. It is impossible, however, to reliably ascertain the operating state of the $NO_x$ storage converter, particularly the degree of damage, so the control of the regeneration is correspondingly imprecise.

EP 0936349 A2 discloses a system for diagnosing an $NO_x$ converter that is connected to an internal-combustion engine, and in which the signals of an $NO_x$-sensitive sensor disposed behind the converter are evaluated for assessing the extent of the damage. This document does not, however, describe a control of the regeneration of the $NO_x$ storage converter. In this connection, EP 0936349 A2 further discloses a reduction in the $NO_x$ concentration after the switch to a rich air-fuel mixture. The $NO_x$ concentration reaches a minimum after a certain time in order to increase subsequently to higher values, and to finally attain a value again that it had attained prior to the switch to an oxygen deficiency. In the known system, the state of the $NO_x$ storage converter, or the damage thereto, is ascertained from the rate of change in the $NO_x$ concentration after the minimum has been reached. This requires the use of values of the $NO_x$ concentration within a relatively large time interval after the switch to an oxygen deficiency, which results in a correspondingly long diagnosis period. A further drawback is that the rate of change of the $NO_x$ concentration in the used time interval is a function of the operating parameters of the engine and the exhaust-gas system, and therefore requires complex corrective measures.

SUMMARY OF THE INVENTION

It is the object of the invention to provide a method and an apparatus for controlling the regeneration of an $NO_x$ storage converter that is essentially based on the assessment of values of the $NO_x$ concentration within a relatively short time interval, and a relatively fast, simple determination of the operating state of the $NO_x$ storage converter for achieving an optimum regeneration.

This object is accomplished with the features of the independent claims.

The invention is based on the realization that, when the $NO_x$ storage converter switches from an absorption mode to a regeneration mode within a short time interval, only a portion of the released $NO_x$ is catalytically converted. The unconverted portion of the $NO_x$ causes a temporary increase in the $NO_x$ concentration in the exhaust gas, the so-called desorption peak. Characteristic properties of this peak, such as duration, height or the like, relate to the function of, or, if applicable, the damage to the $NO_x$ converter. In accordance with the invention, the $NO_x$ concentration in the exhaust gas is measured downstream of the $NO_x$ storage converter, and for determining the operating state of the $NO_x$ storage converter in a transition of the $NO_x$ storage converter from the absorption mode to the regeneration mode, the values of characteristic features of an $NO_x$ desorption peak are ascertained in the time curve of the $NO_x$ concentration, then compared to predetermined test patterns; in the process, a comparison result is formed, and a converter-state signal that characterizes the operating state of the $NO_x$ storage converter is derived from the comparison result. Depending on the converter-state signal, a change is made to the operating parameters, which includes implementing a regeneration measure for attaining an optimum regeneration of the $NO_x$ storage converter. Because the $NO_x$ desorption peak occurs within a relatively short time interval, for example after the transition from a lean to a rich or stoichiometric air-fuel mixture, it is possible to ascertain the operating state in a relatively short time interval. In an ideal case, the duration of a single $NO_x$ desorption peak is sufficient. The ascertainment of values of characteristic features of the $NO_x$ desorption peak in accordance with the invention permits an especially simple evaluation of the time curve of the $NO_x$ concentration in the time interval of concern, and therefore only requires a small outlay for identification.

Further features and advantages of the present invention ensue from the dependent claims and, independently of their summary in the claims, from the following description of preferred exemplary embodiments according to the invention, in conjunction with the associated drawings.

DETAILED DESCRIPTION OF THE INVENTION

Figure 1:
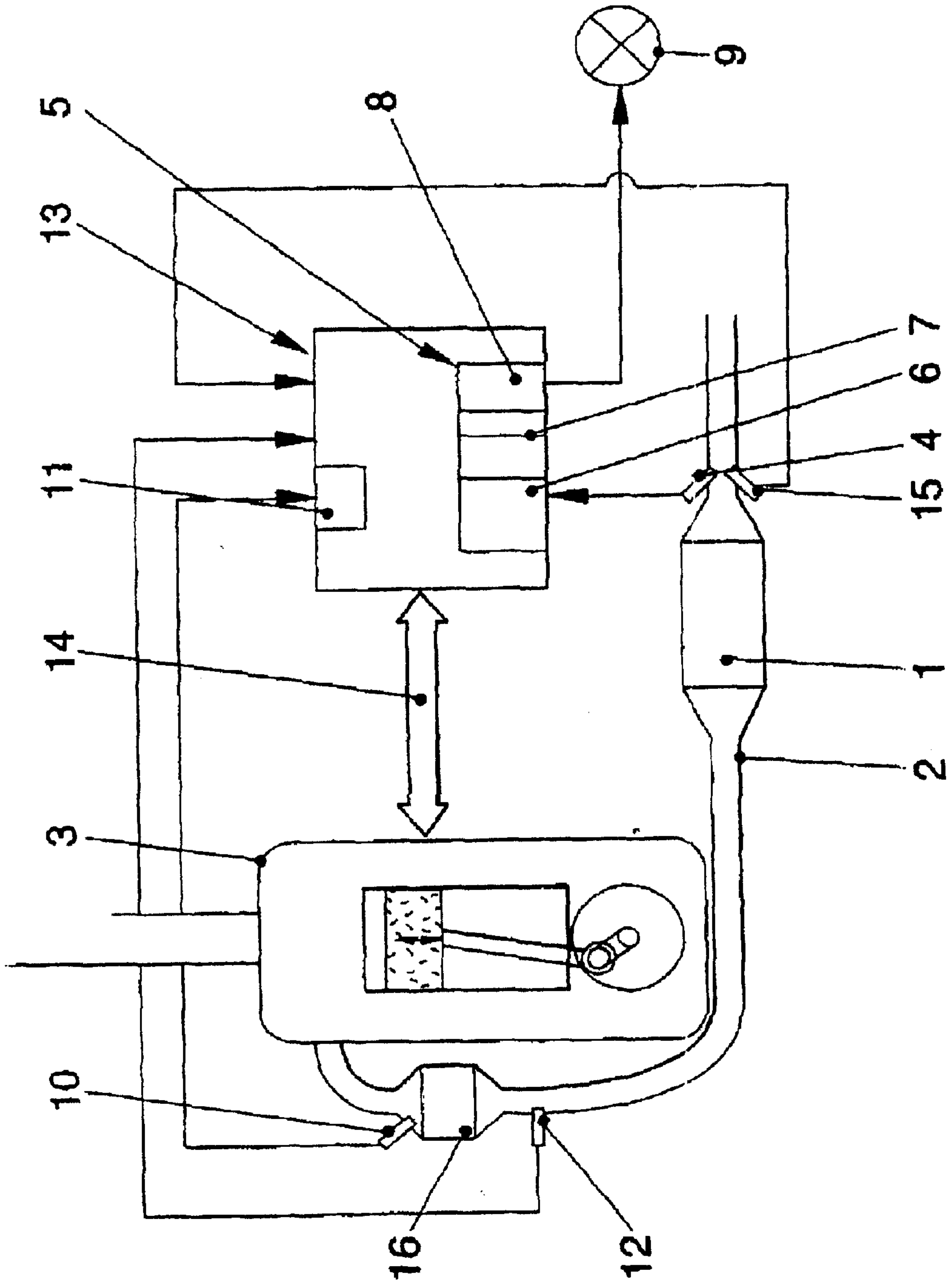
FIG. 1 an internal-combustion engine having an $NO_x$ storage converter.

FIG. 1 is a schematic representation of a internal-combustion engine 3 of a motor vehicle, which can be operated with a lean mixture, such as a stratified-charge engine, having a downstream exhaust-gas system 2 with an $NO_x$ storage converter 1 for storing and converting nitrogen oxides, and an engine-control unit 13 and an $NO_x$ control device 13*a*. The $NO_x$ storage converter 1 can be operated in a storage cycle with an absorption mode and a regeneration mode.

Associated with the exhaust-gas system 2, in addition to the $NO_x$ storage converter 1, are a primary catalytic converter 16, a temperature sensor 12 and lambda sensors 10 and 15 for detecting the lambda value of the exhaust gas in the region of the primary catalytic converter 16, or downstream of the $NO_x$ storage converter 1. A known $NO_x$ sensor 4 disposed downstream of the $NO_x$ storage converter 1 supplies an $NO_x$ signal that selectively represents the $NO_x$ concentration in the exhaust gas, and possibly a corresponding signal for the oxygen concentration.

In a known manner, the engine-control unit 13 utilizes the temperature sensor 12 and further sensors (not shown) to detect operating parameters of the internal-combustion engine 3, such as the exhaust-gas temperature, load, rpm, the non-purified emissions curve or the like, and can influence them with the use of control elements (not shown), such as a throttle valve in the air supply of the internal-combustion engine 3. The engine-control unit 13 and the internal-combustion engine 3, or the control elements, communicate via a cable system 14. The engine-control unit 13 particularly includes a lambda control 11, which is connected to the lambda sensor 10. The engine-control unit 13 further includes the $NO_x$ control device 13*a*, to which the signal of the $NO_x$ sensor 4 is supplied.

The $NO_x$ control device 13*a*, which may be embodied as a separate component, has elements 5 for ascertaining the values of characteristic features of an $NO_x$ desorption peak, elements 6 for comparing the ascertained values to predetermined test patterns, and for forming a comparison result corresponding to the difference between the ascertained values and the test patterns, and evaluation elements 7 and storage elements 8. The $NO_x$ control device 13*a* can be embodied by, for example, a microcontroller having a CPU, a program memory, a data memory and input and output interfaces. A converter-state signal, which characterizes the operating state of the $NO_x$ storage converter, and will be described in detail below, is formed by the evaluation elements 7 as a function of the comparison result supplied by the elements 6. The test patterns, which can be stored in a ROM, for example, represent desired values of the characteristic features of the $NO_x$ desorption peak in the exhaust gas, downstream of the $NO_x$ storage converter 1 in a transition from the absorption mode to the regeneration mode of the $NO_x$ storage converter 1, which will be described in detail below. The engine-control unit 13 evaluates the converter-state signal for achieving an optimum regeneration of the $NO_x$ storage converter.

Figure 2:
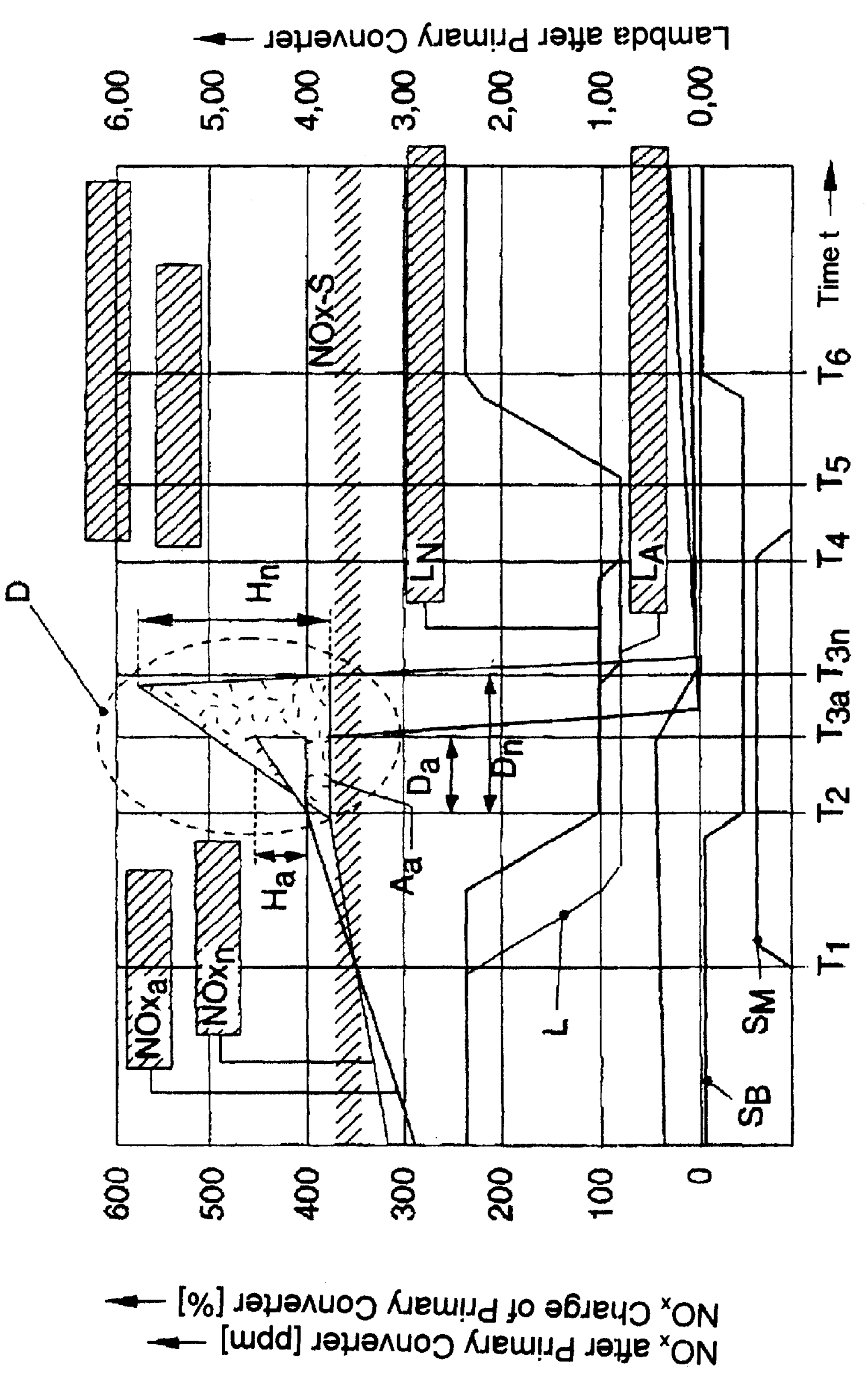
FIG. 2 a diagram of time curves of different signals in a regeneration process of an $NO_x$ storage converter.

FIG. 2 illustrates the fundamental time curve of signals for the regeneration process of an $NO_x$ storage converter 1 in the transition from lean-mix operation to rich-mix operation in a stratified-charge engine for explaining the method of the invention. Up to the time $t_1$, the $NO_x$ storage converter 1 is in the absorption mode. At this time, the engine-control unit 13 recognizes that a regeneration of the $NO_x$ storage converter 1 is necessary. The regeneration can be effected, for example, when the engine-control unit 13 determines that the $NO_x$ concentration in the exhaust gas has reached a threshold value $NO_x$—S, because the $NO_x$ load capacity of the $NO_x$ storage converter 1 is exhausted, so no $NO_x$, or only a small quantity thereof, can be stored. At the time $t_1$,the engine-control unit 13 issues the request for an $NO_x$ reduction, and the value of the control signal $S_M$ is set at 1. The lambda value L of the air-fuel mixture is accordingly lowered from a value>2 to a value of about 0.9, which corresponds to a transition from an oxygen surplus to an oxygen deficiency.

The internal-combustion engine 3 is switched from stratified-charge operation to homogeneous operation beginning at the time $t_1$, because a rich air-fuel mixture is now available. The control signal $S_B$ is set from 1 to 0. At this time, the actual regeneration mode of the $NO_x$ storage converter 1 begins. Under these conditions, first the entire $NO_x$ content in the exhaust gas is briefly converted catalytically at the $NO_x$ storage converter 1. The $NO_x$ concentration temporarily rises above the threshold value $NO_x$—S, which manifests as a desorption peak in the $NO_x$ signal.

Region D of FIG. 2 illustrates the respective $NO_x$ desorption peak for the time curve of the $NO_x$, signals $NO_{xn}$ and $NO_{xa}$ in a new $NO_x$ storage converter 1, and an older one, respectively, with the peak being essentially triangular. The maximum value $H_n$, the surface $A_n$ and the duration $D_n$ for a new $NO_x$, storage converter, and $H_a$, $A_a$ and $D_a$ for an older converter, are shown as characteristic features of the respective $NO_x$ desorption peaks. The values of these features are respectively related to a reference $NO_x$ concentration. In the exemplary embodiment, the value of the measured $NO_x$ concentration at the time $t_2$ is used as the reference $NO_x$ concentration. Other reference values can also be used in accordance with the invention, however, particularly the value of the $NO_x$ concentration at the time $t_1$, when the engine-control unit 13 requests an $NO_x$ reduction. Relating the values of the characteristic features to a reference value allows only the use of values relative to this reference value, instead of absolute values of the $NO_x$ concentration, and therefore permits a simple compensation of possible offset errors of the $NO_x$ sensor 4.

In accordance with the invention, instead of, or in addition to, the cited features of an $NO_x$ desorption peak, other features, particularly the rise slope, the drop slope or the half-width, can be selected. In particular, non-triangular $NO_x$ desorption peaks, possibly having more than one maximum, can also be considered.

For determining the values of the characteristic features from the time curve of the $NO_x$ signal, the $NO_x$ control device 13*a* uses sorting algorithms that are known per se, for example from the area of pattern recognition.

In the continuation of the method according to the invention, the ascertained values of the characteristic features of the $NO_x$ desorption peak are compared to the corresponding test patterns. Because the test patterns represent desired values, especially error threshold values, of the respective characteristic features, they are preferably determined from a model for the $NO_x$ storage converter 1 and measured or calculated operating parameters of the internal-combustion engine 3. Operating parameters can include the load, rpm, non-purified-emissions curve, exhaust-gas temperature, the function of a primary catalytic converter 16 or the like. As an alternative, the test patterns can also be obtained from the measured values of a new $NO_x$ storage converter 1 in a learning phase of the engine-control unit 13 or the $NO_x$ control device 13*a*.

In the simplest case, a test pattern comprises only the desired value of a single feature, such as the maximum value of the $NO_x$ desorption peak.

For a differentiating diagnosis, the values of two or more characteristic features are compared to corresponding test patterns. The comparison result formed corresponding to the difference between the characteristic features and the test patterns indicates the type and extent of the damage. This process incorporates the realization that different types of damage to the $NO_x$ storage converter 1 have different effects on the value of the characteristic features of the $NO_x$ desorption peak. For example, thermal damage to a specific type of $NO_x$ storage converter results in a reduced maximum value of the $NO_x$ desorption peak, but does not influence the duration of the peak, whereas sulfur contamination only leads to a shorter duration. In $NO_x$ storage converters of different types, however, other damaging mechanisms can effect other changes in the $NO_x$ desorption peak.

For attaining an optimum regeneration of the $NO_x$ storage converter 1, the engine-control unit 13 changes the operating parameters of the internal-combustion engine 3 as a function of the converter-state signal. For example, in the case of reversible damage due to thionation, the exhaust-gas temperature can be raised during the regeneration mode for attaining desulfurization. In the case of thermal damage, it is practical to shorten the duration of the regeneration mode. As an alternative or additional measure, a limit temperature can be established for the exhaust gas; as of this temperature, the converter switches from the absorption mode to the regeneration mode. Furthermore, a regeneration measure can be implemented as a function of a previous regeneration measure. For example, after a desulfurization process that yielded undesirable results, a further desulfurization process can be performed at a higher temperature or with a higher concentration of a reducing agent.

It can be seen in FIG. 2 that, for some time after the request for an $NO_x$ regeneration at the time $t_1$, the lambda value $L_n$ measured downstream of the $NO_x$ storage converter 1, for example by the lambda sensor 15, drops from a value>2 to a value close to 1. At a later time, after the end of the $NO_x$ desorption peak, this value is <1 before increasing again after the end of the regeneration mode. As can be inferred from the diagram in FIG. 2, the drop of the lambda value $L_n$ to a value<1 for a new $NO_x$ storage converter 1 occurs at a later time than the corresponding drop of the lambda value $L_a$ for an older converter. These differences in the time curve of the lambda values $L_n$ and $L_a$ can be used as additional information for assessing the $NO_x$ desorption peak, as can a peak in the oxygen concentration that may occur prior to the $NO_x$ desorption peak.

The values of the characteristic features of one or more $NO_x$ desorption peaks can be stored for a later evaluation. As an alternative or additional measure, the time curve of the values of the $NO_x$ concentration can also be stored in at least one or more time windows associated with the $NO_x$ desorption peaks for the purpose of having more comprehensive information.

Because the measured values of the $NO_x$ concentration can be subjected to fluctuations, in a further embodiment of the invention, an average value is formed for compensating these fluctuations. For this purpose, the values of the characteristic features are ascertained over numerous storage cycles of the $NO_x$ storage converter, and a corresponding average value, such as an arithmetic average value, is formed. This measure can be general, or dependent on the ascertained values of the characteristic features, particularly the value of the fluctuation range.

In a further embodiment of the invention, a converter-state characteristic number K is determined from the ascertained values of the characteristic features of the $NO_x$ desorption peak through the assessment of the values of the characteristic features and their algebraic combination. The following equation represents an option for performing this procedure:

$$K=H_k*c_1+D_k*c_2+A_k*c_3.$$

Here, $H_k$ represents the maximum value, $D_k$ represents the temporal duration, and $A_k$ represents the surface of the respective $NO_x$ desorption peak. The assessment factors $c_1$ through $C_3$ permit an adaptation to the specific properties of a concrete $NO_x$ storage converter 1. The assessment factors likewise permit an adaptation to the properties of the internal-combustion engine 3 and the exhaust-gas system 2. In this embodiment of the invention, the converter-state signal is formed as a function of the value of the converter characteristic number K and an error threshold value.

Figure 3:
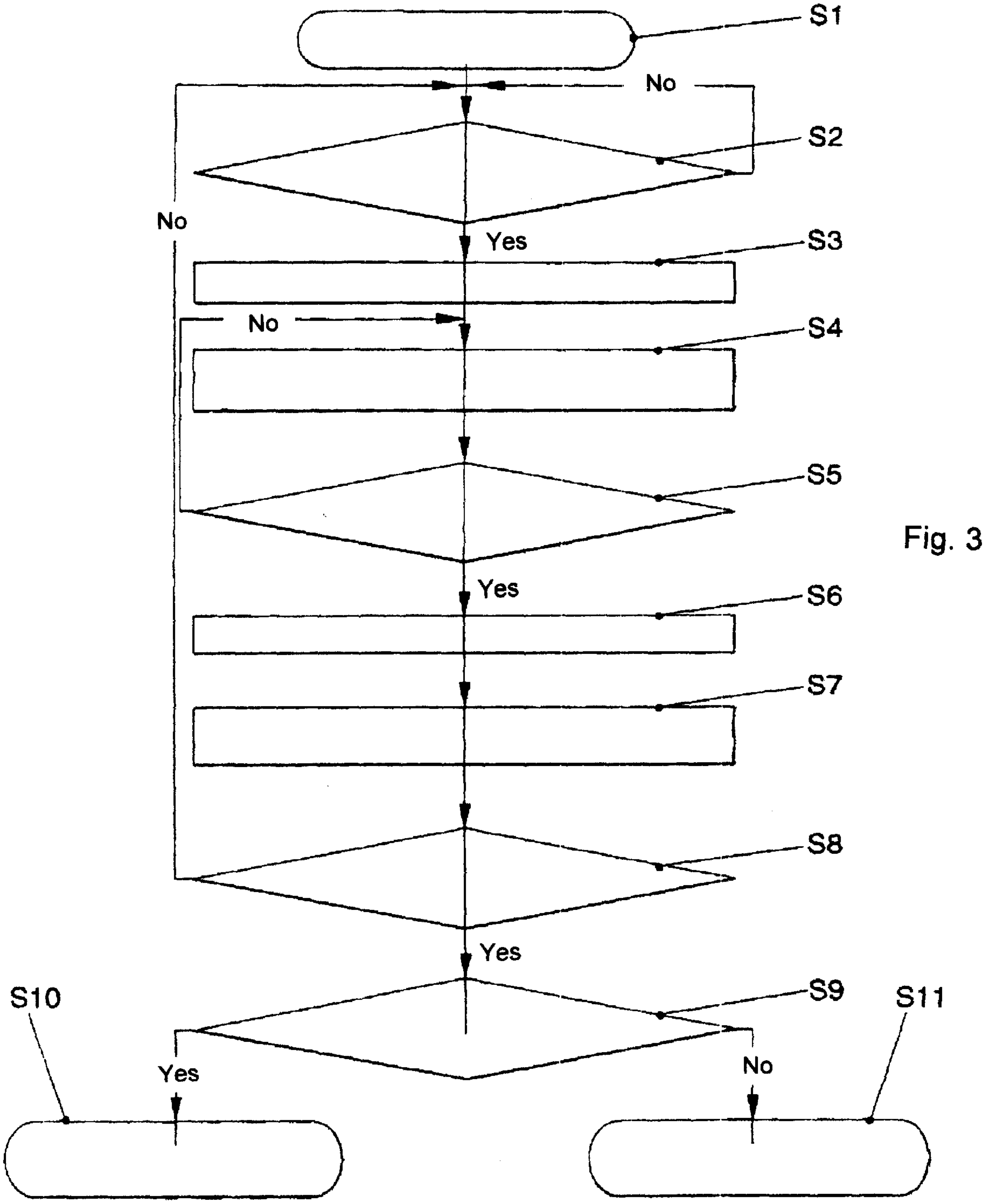
FIG. 3 a flow chart of a control of the regeneration of an $NO_x$ storage converter.

The flowchart in FIG. 3 shows a typical flow of the ascertainment and assessment of the features of an $NO_x$ desorption peak, with subsequent regeneration measures. After the diagnosis begins in Step S1, there is no action until a signal indicates the beginning of the $NO_x$ regeneration mode at the time $t_2$, because the $NO_x$ signal has attained the threshold $NO_x$—S. As soon as a decision affirming this has been made at the branch point S2, the value of the $NO_x$ signal is stored at the time $t_2$ in Step S3. Then, in Step S4, the time curve of the $NO_x$ signal is stored. It is not absolutely necessary to store the entire time curve of the $NO_x$ signal, because a partial segment of the time curve of the $NO_x$ signal can suffice, depending on the selected characteristic features of the $NO_x$ desorption peak. As soon as the $NO_x$ signal falls below the stored value of the $NO_x$ signal at the time $t_2$, a decision is made at the branch point S5 for ascertaining the $NO_x$ desorption-peak features (values) in Step S6, because at this time the $NO_x$ desorption peak is considered to have ended. The ascertained values are assessed in Step S7; subsequently, in Step S8, it is determined whether a predetermined error threshold value is exceeded. If the answer is no, the flow returns to the branch point S2. If an error is detected, in Step S9 a decision is made regarding whether thionation or thermal damage with a reduced $NO_x$ storage capacity is present.

If thionation is confirmed, a desulfurization process is initiated in Step S10. If thermal damage with a reduced $NO_x$ storage capacity is confirmed, in Step S11 the regeneration mode is adapted, for example through a shortening of its duration.

In a further embodiment of the invention, it is provided that the display elements 9 immediately warn the driver of a motor vehicle, based on the converter-state signal. It is also possible to convey information that is stored in the memory elements 8 to a shop diagnosis system when the vehicle is being serviced in the shop.

In summary, in accordance with the invention, the ascertainment and subsequent evaluation of values of characteristic features of the $NO_x$ desorption peak that occurs in the transition from an absorption mode to a regeneration mode permit a rapid, simple optimization of the regeneration of the $NO_x$ storage converter of a motor vehicle.

What is claimed is:

1. A method for controlling a regeneration of an $NO_x$ storage converter that is disposed in an exhaust-gas system of an internal-combustion engine and that is operatable in an absorption mode and a regeneration mode, with operating parameters of the internal-combustion engine being changed as a function of an operating state of the $NO_x$ storage converter, comprising:

measuring an $NO_x$ concentration in exhaust gas downstream of the $NO_x$ storage converter;

determining the operating state of the $NO_x$ storage converter, including damage to the $NO_x$ storage converter, when the $NO_x$ storage converter switches from the absorption mode to the regeneration mode, by ascertaining, from the measured $NO_x$ concentration in the exhaust gas, values of characteristic features of an $NO_x$ desorption peak in a time curve of the Nox, comparing the ascertained values to predetermined test patterns, forming a comparison result, and determining from the comparison result a converter-state signal that characterizes the operating state of the $NO_x$ converter; and changing the operating parameters of the internal combustion engine by implementing a regeneration measure, as a function of the converter-state signal, for attaining a regeneration of the $NO_x$ storage converter, the regeneration measure including a desulfurization of the $NO_x$ storage converter.

2. The method according to claim 1, wherein the regeneration measure is implemented as a function of a previous regeneration measure.

3. The method according to claim 2, wherein said determining includes determining an $NO_x$ storage capacity of the $NO_x$ storage converter and, if the $NO_x$ storage capacity is reduced, a duration of the regeneration mode is shortened as the regeneration measure, and/or a limit temperature is established for the exhaust gas, above which temperature the $NO_x$ storage converter switches from the absorption mode to the regeneration mode.

4. The method according to claim 2, wherein the characteristic features of the $NO_x$ desorption peak include shape, number of maxima, height of maxima, duration, surface, half-width, rise slope and/or drop slope, all relating to a predetermined reference $NO_x$ concentration.

5. The method according to claim 2, wherein only relative changes in the $NO_x$ concentration with respect to a predetermined amount value are considered.

6. The method according to claim 2, wherein the predetermined test patterns are selected as a function of the operating parameters of the internal-combustion engine.

7. The method according to claim 2, wherein , depending on the values of the characteristic features of the $NO_x$ desorption peak, including a range of fluctuation thereof for a plurality of storage cycles of the $NO_x$ storage converter, the values of the characteristic features are stored, an average value is calculated and the converter-state signal is determined as a function of the average value.

8. The method according to claim 1, wherein said determining includes determining an $NO_x$ storage capacity of the $NO_x$ storage converter and, if the $NO_x$ storage capacity is reduced, a duration of the regeneration mode is shortened as the regeneration measure, and/or a limit temperature is established for the exhaust gas, above which temperature the $NO_x$ storage converter switches from the absorption mode to the regeneration mode.

9. The method according to claim 1, wherein the characteristic features of the $NO_x$ desorption peak include shape, number of maxima, height of maxima, duration, surface, half-width, rise slope and/or drop slope, all relating to a predetermined reference $NO_x$ concentration.

10. The method according to claim 9, further comprising forming a converter characteristic number, using the height of the maxima, the duration, and the surface of the $NO_x$ desorption peak, the converter-state signal being formed as a function of the converter characteristic number.

11. The method according to claim 10, wherein an $NO_x$ threshold value, at which the regeneration mode of the $NO_x$ storage converter is initiated, is selected as the predetermined reference $NO_x$ concentration.

12. The method according to claim 10, wherein, in an internal-combustion engine that is adapted to be operated in a stratified-charge mode, a value of the $NO_x$ concentration at a time that the internal-combustion engine is switched to a homogeneous operation is selected as the predetermined reference $NO_x$ concentration.

13. The method according to claim 9, wherein an $NO_x$ threshold value, at which the regeneration mode of the $NO_x$ storage converter is initiated, is selected as the predetermined reference $NO_x$ concentration.

14. The method according to claim 9, wherein, in an internal-combustion engine that is adapted to be operated in a stratified-charge mode, a value of the $NO_x$ concentration at a time that the internal-combustion engine is switched to a homogeneous operation is selected as the predetermined reference $NO_x$ concentration.

15. The method according to claim 14, wherein the predetermined test patterns are selected as a function of the operating parameters of the internal-combustion engine.

16. The method according to claim 1, wherein only relative changes in the $NO_x$ concentration with respect to a predetermined amount value are considered.

17. The method according to claim 16, wherein, depending on the values of the characteristic features of the $NO_x$ desorption peak, including a range of fluctuation thereof for a plurality of storage cycles of the $NO_x$ storage converter, the values of the characteristic features are stored, an average value is calculated and the converter-state signal is determined as a function of the average value.

* * * * *